(12) United States Patent
Yao et al.

(10) Patent No.: US 9,026,634 B2
(45) Date of Patent: May 5, 2015

(54) METHOD AND SYSTEM FOR MANAGING PERSONAL NETWORK

(75) Inventors: Lizhe Yao, Shenzhen (CN); Jun Chen, Shenzhen (CN); Man Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 245 days.

(21) Appl. No.: 13/640,112

(22) PCT Filed: Mar. 18, 2011

(86) PCT No.: PCT/CN2011/071974
§ 371 (c)(1),
(2), (4) Date: Oct. 9, 2012

(87) PCT Pub. No.: WO2011/157073
PCT Pub. Date: Dec. 22, 2011

(65) Prior Publication Data
US 2013/0041996 A1    Feb. 14, 2013

(30) Foreign Application Priority Data

Jun. 13, 2010   (CN) .......................... 2010 1 0207449

(51) Int. Cl.
*H04W 24/00* (2009.01)
*H04W 4/20* (2009.01)
(Continued)

(52) U.S. Cl.
CPC .............. *H04W 24/00* (2013.01); *H04W 4/203* (2013.01); *H04W 8/04* (2013.01); *H04W 60/00* (2013.01); *H04W 60/06* (2013.01); *H04L 41/12* (2013.01)

(58) Field of Classification Search
CPC ....... H04W 4/203; H04W 8/04; H04W 8/005; H04W 24/00; H04W 60/00; H04W 60/005; H04W 60/04; H04W 60/06; H04W 84/18; H04W 88/02; H04W 88/04; H04W 88/16; H04W 88/18; H04W 88/182; H04L 41/12
See application file for complete search history.

(56) References Cited

U.S. PATENT DOCUMENTS

2005/0078642 A1\*  4/2005  Mayer et al. .................. 370/338
2006/0126649 A1    6/2006  Akiyoshi
(Continued)

FOREIGN PATENT DOCUMENTS

CN        1937437 A       3/2007
CN      101166115 A       4/2008
(Continued)

OTHER PUBLICATIONS

3GPP TS 23.259 V9.3.0, "3rd Generation Partnership Project; Technical Specification Group Core Network and Terminals; Personal Network Management (PNM); Procedures and Information Flows; Stage 2 (release 9)", Mar. 2010.\*
(Continued)

*Primary Examiner* — Brian J Gillis
*Assistant Examiner* — Gil H. Lee
(74) *Attorney, Agent, or Firm* — Oppedahl Patent Law Firm LLC

(57) ABSTRACT

The disclosure discloses a method for managing a Personal Network (PN), which includes: realizing a management for the PN by any one of management ways including establishing the PN, releasing the PN, adding a PN device in the PN and enabling the PN device to leave the PN or a combination thereof. The disclosure also discloses a system for managing a PN, which includes a management unit for realizing a management for the PN by any one of management ways including establishing the PN, releasing the PN, adding a PN device in the PN and enabling the PN device to leave the PN or a combination thereof. By adopting the method and system of the disclosure, the management for the PN consisting of a large number of PN devices can be realized.

13 Claims, 6 Drawing Sheets

(51) Int. Cl.
*H04W 8/04* (2009.01)
*H04W 60/00* (2009.01)
*H04W 60/06* (2009.01)
*H04L 12/24* (2006.01)

(56) References Cited

U.S. PATENT DOCUMENTS

| | | | |
|---|---|---|---|
| 2007/0141988 A1 | 6/2007 | Kuehnel et al. | |
| 2008/0159242 A1* | 7/2008 | Rayzman et al. | 370/338 |
| 2008/0167038 A1 | 7/2008 | Sun | |
| 2008/0209036 A1* | 8/2008 | Sakamoto et al. | 709/224 |
| 2008/0214110 A1 | 9/2008 | Kim et al. | |
| 2009/0070884 A1* | 3/2009 | Wu et al. | 726/27 |
| 2009/0113027 A1 | 4/2009 | Gomyo | |
| 2009/0161627 A1* | 6/2009 | Ekambaram et al. | 370/331 |
| 2009/0300357 A1 | 12/2009 | Kumar et al. | |
| 2010/0197236 A1* | 8/2010 | Kawamura | 455/67.7 |
| 2011/0090886 A1* | 4/2011 | Park et al. | 370/338 |
| 2011/0093704 A1* | 4/2011 | Park et al. | 713/168 |
| 2011/0117914 A1* | 5/2011 | Yang et al. | 455/435.1 |
| 2013/0077532 A1* | 3/2013 | Deprun et al. | 370/255 |

FOREIGN PATENT DOCUMENTS

| | | | |
|---|---|---|---|
| CN | 101299859 A | | 11/2008 |
| CN | 101692656 A | | 4/2010 |
| EP | 1677482 A1 | | 7/2006 |
| EP | 2086167 A1 | * | 8/2009 |
| EP | 2166790 A1 | | 3/2010 |
| WO | 2007088638 A1 | | 8/2007 |
| WO | 2008095402 A1 | | 8/2008 |

OTHER PUBLICATIONS

International Search Report on international application No. PCT/CN2011/071974, mailed on Jul. 7, 2011.

English Translation of the Written Opinion of the International Search Authority in international application No. PCT/CN2011/071974, mailed on Jul. 7, 2011.

3rd Generation Partnership Project; Technical Specification Group Core Network and Terminals; Personal Network Management (PNM); Procedures and Information Flows; Stage 2 (Release 9) Mar. 31, 2010.

Supplementary European Search Report in European application No. 11795039.4, mailed on Dec. 20, 2013. (7 pages—see entire document).

* cited by examiner

METHOD AND SYSTEM FOR MANAGING PERSONAL NETWORK

TECHNICAL FIELD

The disclosure relates to the personal network field, in particular to a method and a system for managing a Personal Network (PN).

BACKGROUND

Along with the development of the science and technology, one has a increasing number of personal devices, such as a mobile phone, a notebook computer, a Personal Digital Assistant (PDA), a Moving Picture Experts Group Audio Layer-3 (MP3) player, a MP4 player and so on; moreover, these devices have gradually powerful capabilities and most of them have a short-distance communication capability. Therefore, people are desirable to connect these devices together so as to form a PN and share the resources and capabilities with each other.

However, following the continuous increase of the PN devices in the PN, there is an urgent problem to effectively combine the PN devices to form a PN and then to manage the PN when a large number of PN devices exist. Currently, there is not an effective solution for solving the problem about how to manage the PN which is composed of a large number of PN devices.

SUMMARY

In view of this, the main purpose of the disclosure is to provide a method and a system for managing a PN, which can realize a management for the PN which is composed of a large number of PN devices.

In order to achieve the purpose, the technical solution of the disclosure is realized below.

A method for managing the PN, which includes: realizing a management for the PN by any one of management ways including establishing the PN, releasing the PN, adding a PN device in the PN and enabling the PN device to leave the PN or a combination thereof;

wherein establishing the PN includes: requesting, by the PN device, for a mode of an opposite-end device; requesting, by the PN device, a PN gateway to establish the PN when the mode returned by the opposite-end device is the PN gateway; sending, by the PN gateway, a registration request to a PN server; and storing, by the PN server, information of the PN.

Wherein, the method further includes: finding, by the PN device and the PN gateway, each other and establishing a physical link before the PN device requests for the mode of the PN gateway when the PN device initiates the establishment of the PN.

Wherein, the method further includes: certificating and/or authenticating, by the PN gateway, the PN device and allocating an identifier for the PN device after the PN device requests for establishing the PN.

Wherein, the method further includes: certificating and/or authenticating, by the PN server, the PN gateway after the PN gateway sends the registration request to the PN server.

Wherein, the method further includes: returning, by the PN server, a response to the PN gateway after the PN server stores the information of the PN; and returning, by the PN gateway the response to the PN device.

Wherein, the method further includes: when the PN device initiates the release of the PN, sending, by the PN device, a request for releasing the PN to the PN gateway; sending, by the PN gateway, the request for releasing the PN to the PN server; deleting, by the PN server, the information of the PN; and notifying, by the PN gateway, each of the other PN devices of the PN that the PN is released; wherein each of the other PN devices is a device in the PN other than the PN device that initiates the request for releasing the PN.

Wherein, the method further includes: when the PN gateway initiates the release of the PN, sending, by the PN gateway, a request for releasing the PN to the PN server; deleting, by the PN server, the information of the PN; and notifying, by the PN gateway, all PN devices of the PN that the PN is released.

Wherein, the method further includes: when the PN initiates the release of the PN, notifying, by the PN server, the PN gateway that the PN will be released; notifying, by the PN gateway, all PN devices of the PN that the PN will be released; and deleting, by the PN server, the information of the PN.

Wherein, the method further includes: when the PN device requests to join in the PN, requesting, by the PN device, for the mode of the PN gateway; returning, by the PN gateway, the mode being the PN gateway to the PN device; inquiring, by the PN device, whether the PN gateway belongs to one PN; returning, by the PN gateway, the PN to which the PN gateway belongs to the PN device; and sending, by the PN device, a request for joining in the PN to which the PN gateway belongs to the PN gateway, and joining in the PN.

Wherein, the method further includes: when the PN device is invited to join in the PN by other devices which are PN gateways, requesting, by the PN gateway, for the mode of the PN device; returning, by the PN device, the mode being the PN device to the PN gateway; sending, by the PN gateway, a request for inviting the PN device to join in the PN to the PN device, and joining, by the PN device, in the PN.

Wherein, the method further includes: when the PN device determines to leave the PN, notifying, by the PN device, the PN gateway that the PN device will leave the PN; requesting, by the PN gateway, the PN server to update the information of the PN; updating, by the PN server, the information of the PN so that the PN device leaves the PN.

Wherein, the mode includes any one of the follows: the PN device, the PN gateway and the PN server.

Wherein, the information of the PN includes at least one of: a name of the PN, an identifier of the PN, and member information.

A system for managing a Personal Network (PN), which includes a management unit for realizing a management for the PN by any one of management ways including establishing the PN, releasing the PN, adding a PN device in the PN and enabling the PN device to leave the PN or a combination thereof;

wherein establishing the PN includes: the PN device requests for a mode of an opposite-end device; the PN device requests a PN gateway to establish the PN when the mode returned by the opposite-end device is the PN gateway; the PN gateway sends a registration request to a PN server; and the PN server stores information of the PN.

Wherein, the management unit is further configured to cause the PN device and the PN gateway to find each other and establish a physical link before the PN device requests for the mode of the PN gateway when the PN device initiates the establishment of the PN.

Wherein, when the PN device initiates the release of the PN, the management unit is further configured to cause: the PN device to send a request for releasing the PN to the PN gateway; the PN gateway to send the request for releasing the PN to the PN server; the PN server to delete the information of the PN; and the PN gateway to notify each of the other PN devices of the PN that the PN is released; wherein each of the other PN devices is a device in the PN other than the PN device that initiates the request for releasing the PN.

Wherein, when the PN gateway initiates the release of the PN, the management unit is further configured to cause: the PN gateway to send a request for releasing the PN to the PN server; the PN server to delete the information of the PN; and the PN gateway to notify all PN devices of the PN that the PN is released.

Wherein, when the PN server initiates the release of the PN, the management unit is further configured to cause: the PN server to notify the PN gateway that all PN devices of the PN that the PN will be released via the PN gateway; and the PN server to delete the information of the PN.

Wherein, when the PN device requests to join in the PN, the management unit is further configured to cause: the PN device to request for the mode of the PN gateway; the PN gateway to return the mode being the PN gateway to the PN device; the PN device to inquire whether the PN gateway belongs to one PN; the PN gateway to return the PN to which the PN gateway belongs to the PN device; and the PN device to send a request for joining in the PN to which the PN gateway belongs to the PN gateway, and to join in the PN.

Wherein, when the PN device is invited to join in the PN by other devices which are PN gateways, the managing unit is further configured to cause: the PN gateway requests for the mode of the PN device; the PN device to return the mode being the PN device to the PN gateway; the PN gateway to send a request for inviting the PN device to join in the PN to the PN device, and the PN device to join in the PN.

wherein when the PN device determines to leave the PN, the management unit is further configured to cause: the PN device to notify the PN gateway that the PN device will leave the PN; the PN gateway to request the PN server to update the information of the PN; the PN server to update the information of the PN; and the PN device to leave the PN.

In the disclosure, the management for the PN is realized by any one of management ways including establishing the PN, releasing the PN, adding a PN device in the PN and enabling the PN device to leave the PN or a combination thereof, wherein establishing the PN includes: requesting, by the PN device, for a mode of an opposite-end device; requesting, by the PN device, a PN gateway to establish the PN when the mode returned by the opposite-end device is the PN gateway; sending, by the PN gateway, a registration request to a PN server; and storing, by the PN server, information of the PN.

By adopting the disclosure, the convenient management including establishing the PN, releasing the PN, adding a PN device in the PN and enabling the PN device to leave the PN is realized, so that it is possible to implement the management of the PN which is composed of a large number of PN devices when the large number of PN devices exist.

DETAILED DESCRIPTION

The basic idea of the disclosure includes: realizing a management for the PN by any one of management ways including establishing the PN, releasing the PN, adding a PN device in the PN and enabling the PN device to leave the PN or a combination thereof; wherein establishing the PN includes: requesting, by the PN device, for a mode of an opposite-end device; requesting, by the PN device, a PN gateway to establish the PN when the mode returned by the opposite-end device is the PN gateway; sending, by the PN gateway, a registration request to a PN server; and storing, by the PN server, information of the PN.

It should be pointed out that: the opposite-end device is relative to the device which initiates the request; the device initiating the request is a local-end device; and before initiating the request, the local-end device searches opposite-end devices nearby and requests to obtain the mode of the opposite-end device. For example, in the disclosure, before the PN device sends a request for establishing the PN to the PN gateway, the PN device needs to firstly find a device that operates in the PN gateway mode. At this moment, the PN device may request more than one opposite-end device nearby for the modes of the opposite-end devices; if the result returned by the opposite-end device is not the PN gateway, the PN device no longer sends the request for establishing the PN to the opposite-end device.

The embodiments of the technical solution are further described below with reference to the accompanying drawings in detail.

Figure 1:
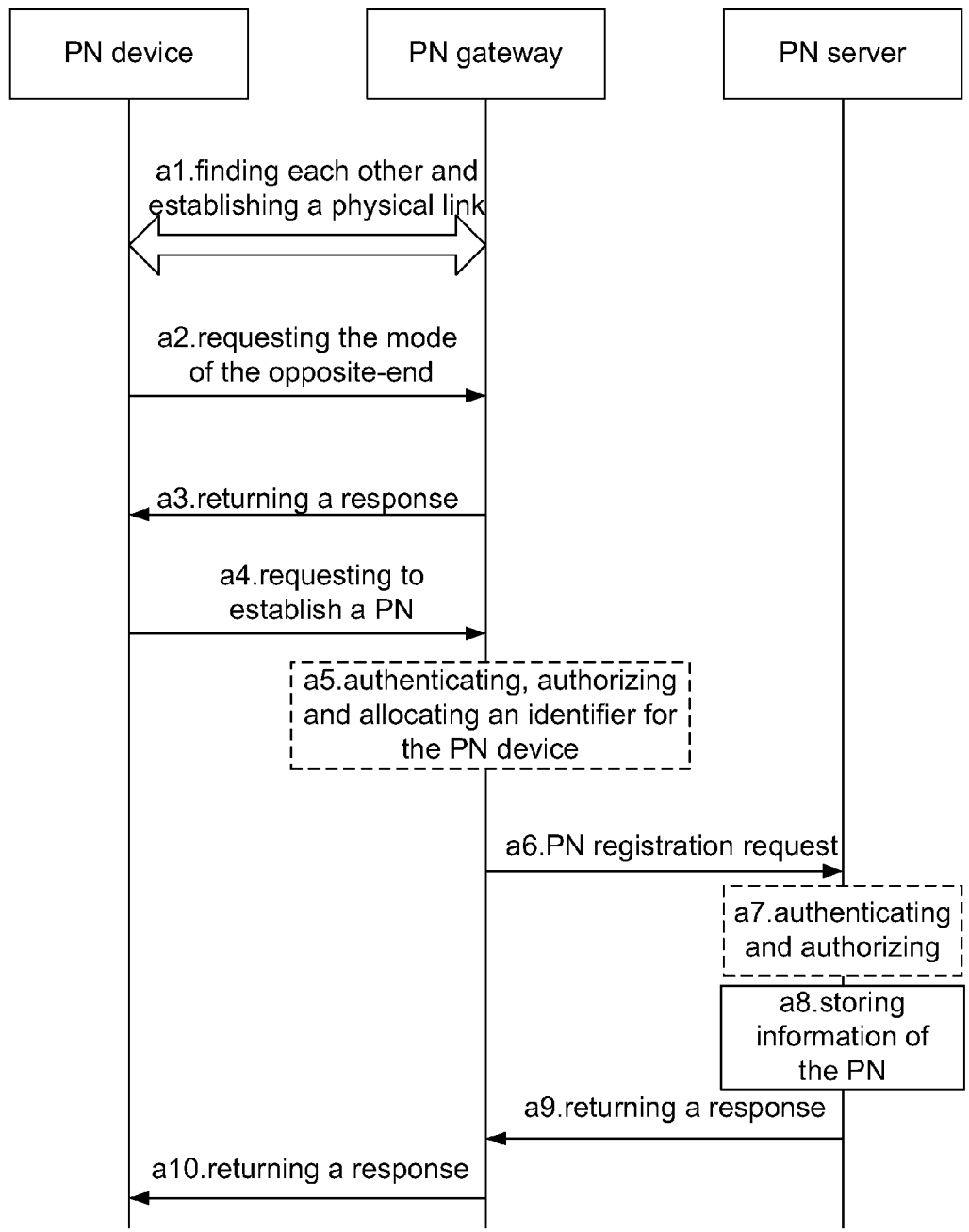
FIG. 1 is a schematic diagram showing an establishment procedure of a Personal Network (PN) according to the disclosure.

A method for managing a PN, mainly includes:

1, establishing a PN, wherein the establishment is initiated by a PN device and as shown in the FIG. 1, the establishment procedure mainly includes:

a1, the PN device and the PN gateway find each other and establish a physical link;

a2, the PN device sends to the PN gateway a request for obtaining the mode (role) thereof;

a3, the PN gateway returns a response to the PN device to illustrate that the mode is the PN gateway;

a4, the PN device sends a request for establishing the PN to the PN gateway;

a5, the PN gateway authenticates and authorizes the PN device and allocates an identifier for the PN device.

a6, the PN gateway sends a PN registration request to the PN server;

a7, the PN server performs operations, such as certification, authentication and the like, to the PN gateway;

a8, the PN server stores information of the PN;

a9, the PN server returns a response to the PN gateway; and a10, the PN gateway returns the response to the PN device.

Here, in the a1, if the physical link has been established, the a1 may be left out.

Here, in the a2, the mode is related to a role which the device now acts as; the role generally includes the PN device, the PN gateway and the PN server.

Here, the a5 and a7 are optional.

It should be pointed out that: the mode involved in the disclosure can also be called role; for example, in the a2, the expression that the PN device sends to the PN gateway a request for obtaining the mode thereof can be also described with the expression that the PN device sends to the PN gateway a request for obtaining the role thereof and so on. The information of the PN involved in the disclosure includes at least one of: a name of the PN, an identifier of the PN, and member information. The name of the PN can be arbitrary and be customized by a user; the identifier of the PN is used to identify the PN, such as the PN 1, the PN2 and so on; and the member information is PN device information included in the PN.

Figure 2:
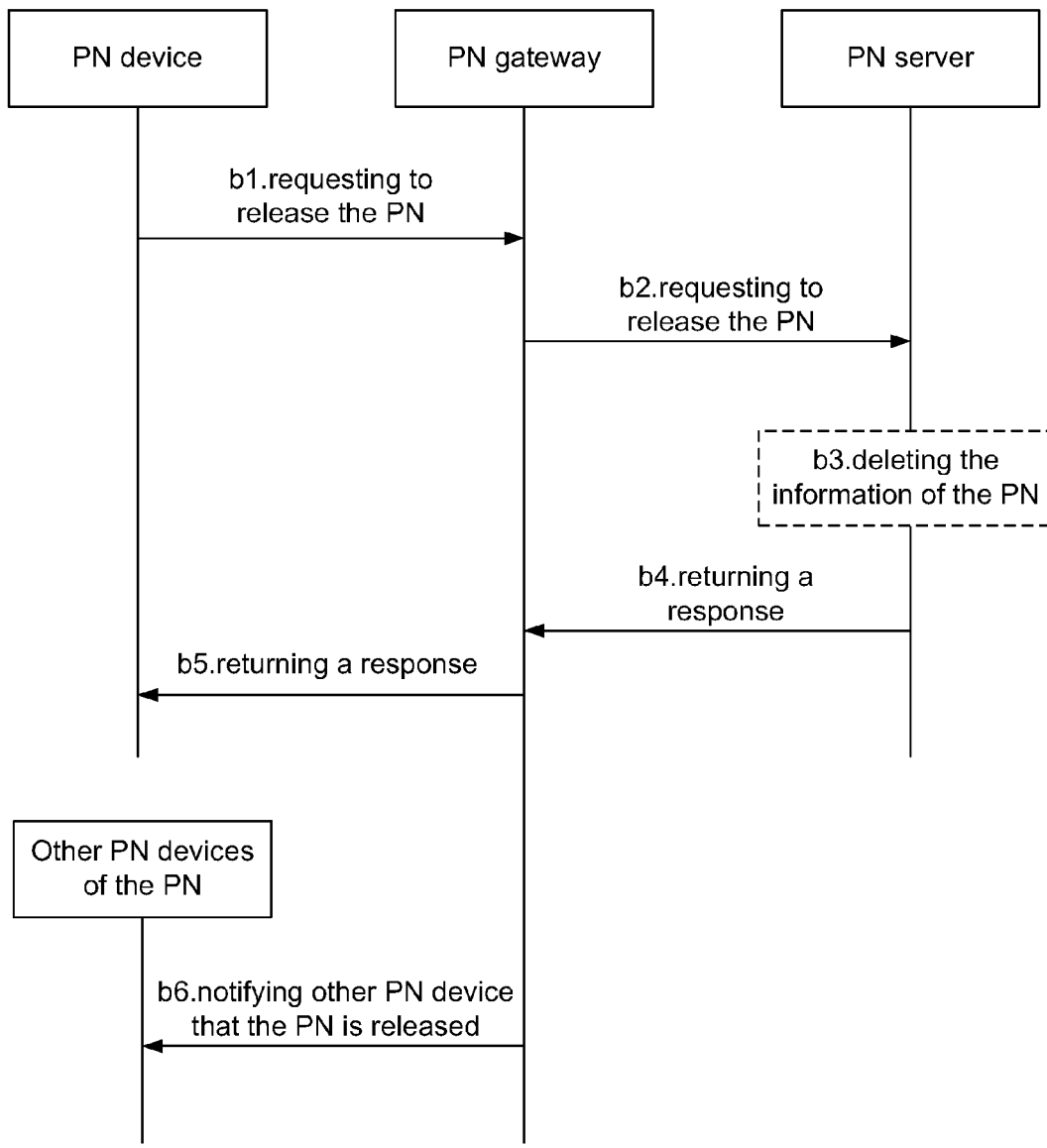
FIG. 2 is a schematic diagram showing a deletion procedure of the PN according to the disclosure.

2, releasing the PN, which can be divided into two cases:

Case 1, the PN device or the PN gateway initiates the release of the PN, as shown in the FIG. 2, the PN device initiates the release of the PN, wherein the releasing procedure mainly includes:

b1, the PN sends a request for releasing (deleting) the PN to the PN gateway;

b2, the PN gateway sends the request for releasing (deleting) the PN to the PN server;

b3, the PN server deletes the information of the PN;

b4, the PN server returns a response to the PN gateway;

b5, the PN server returns the response to the PN device; and b6, the PN gateway notifies each of the other PN devices of the PN that the PN is released (deleted).

Here, if the releasing of the PN is initiated by the PN gateway, the b1 and b5 can be left out and the b6 can be changed to notifying each PN device of the PN that the PN is released. It should be pointed out that the procedure of releasing the PN involved in the disclosure can be also called the procedure of deleting the PN. When it is called the procedure of deleting the PN, the technical expression can be illustrated by using the term in the bracket above for example, in the b1, the expression that the PN device sends a request for releasing the PN to the PN gateway can be called with the expression that the PN device sends a request for deleting the PN to the PN gateway, and so on.

Figure 3:
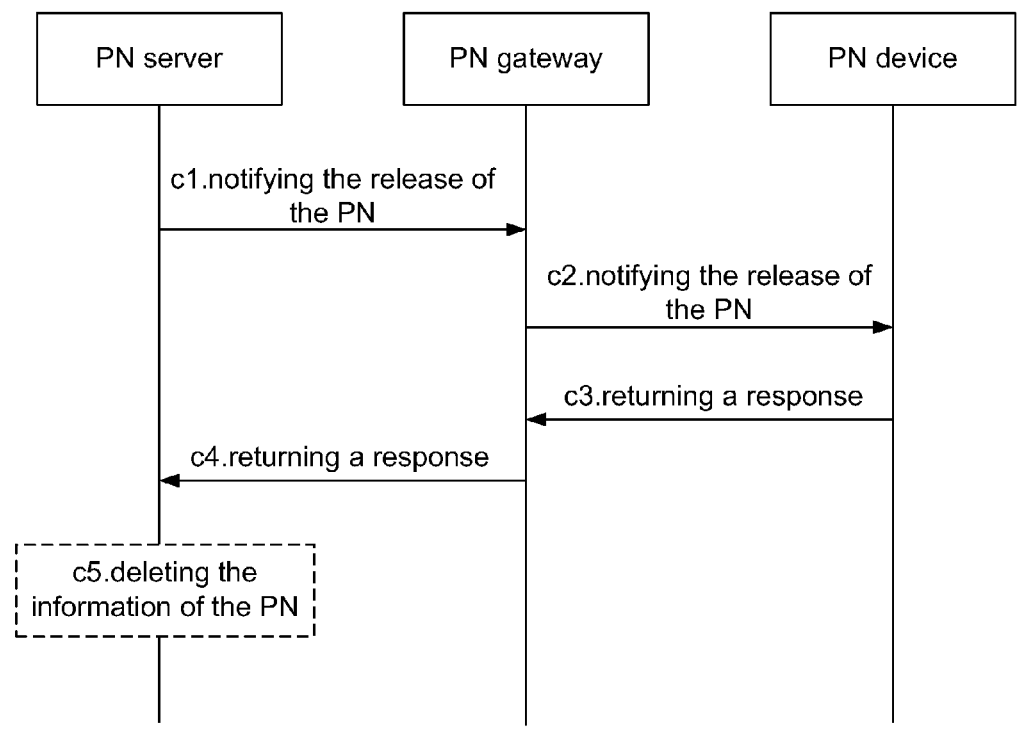
FIG. 3 is a schematic diagram showing a deletion procedure of the PN initiated by a PN server according to the disclosure.

Case 2, the PN server initiates the release of the PN, as shown in FIG. 3, the releasing procedure mainly includes:

c1, the PN server notifies the PN gateway to release (delete) the PN;

c2, the PN gateway notifies each PN device of the PN that the PN will be released (deleted);

c3, the PN device returns a response to the PN gateway;

c4, the PN gateway returns the response to the PN server; and c5, the PN server deletes the information of the PN.

Figure 4:
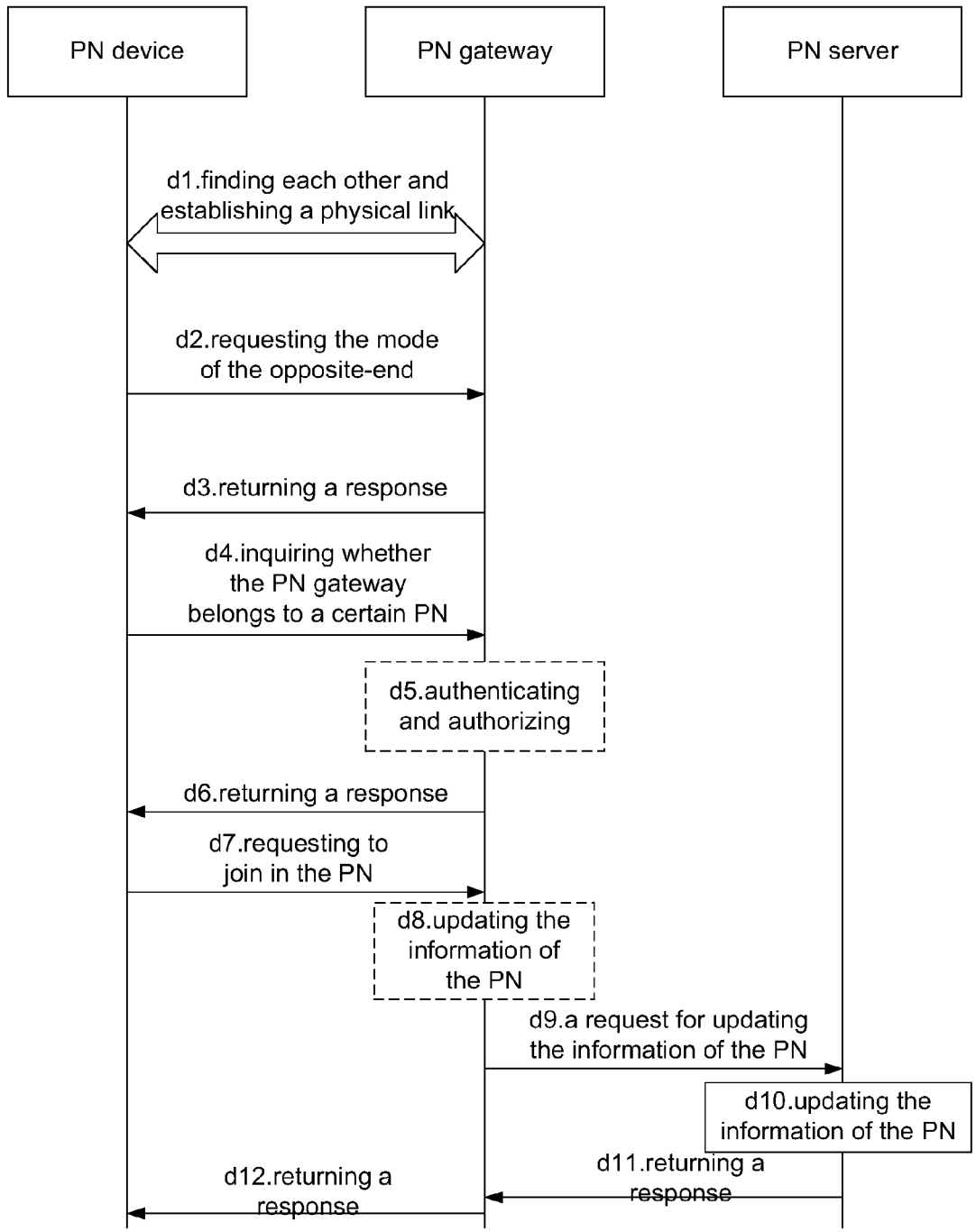
FIG. 4 is a schematic diagram showing a procedure in which a PN device actively joins in the PN according to the disclosure.

3, the PN device joining in the PN, which can be divided into two cases:

Case 1, the PN device requests to join in the PN, as shown in FIG. 4, the joining procedure mainly includes:

d1, the PN device and the PN gateway find each other and establish a physical link;

d2, the PN device sends to the PN gateway a request for obtaining the mode (role) thereof;

d3, the PN gateway returns a response to the PN device to illustrate that the mode is the PN gateway;

d4, the PN device inquires whether the PN gateway has belonged to one PN;

d5, the PN gateway performs operations, such as authentication and authorization, and the like, to the PN device;

d6, the PN gateway returns a response to illustrate that the PN gateway belongs to one PN;

d7, the PN sends a request for joining in the PN to the PN gateway;

d8, the PN gateway updates the information of the PN;

d9, the PN gateway requests the PN server to update the information of the PN;

d10, the PN server updates the information of the PN;

d11, the PN server returns a response to the PN gateway; and d12, the PN gateway returns the response to the PN device.

Here, the d5 and d8 are optional.

Figure 5:
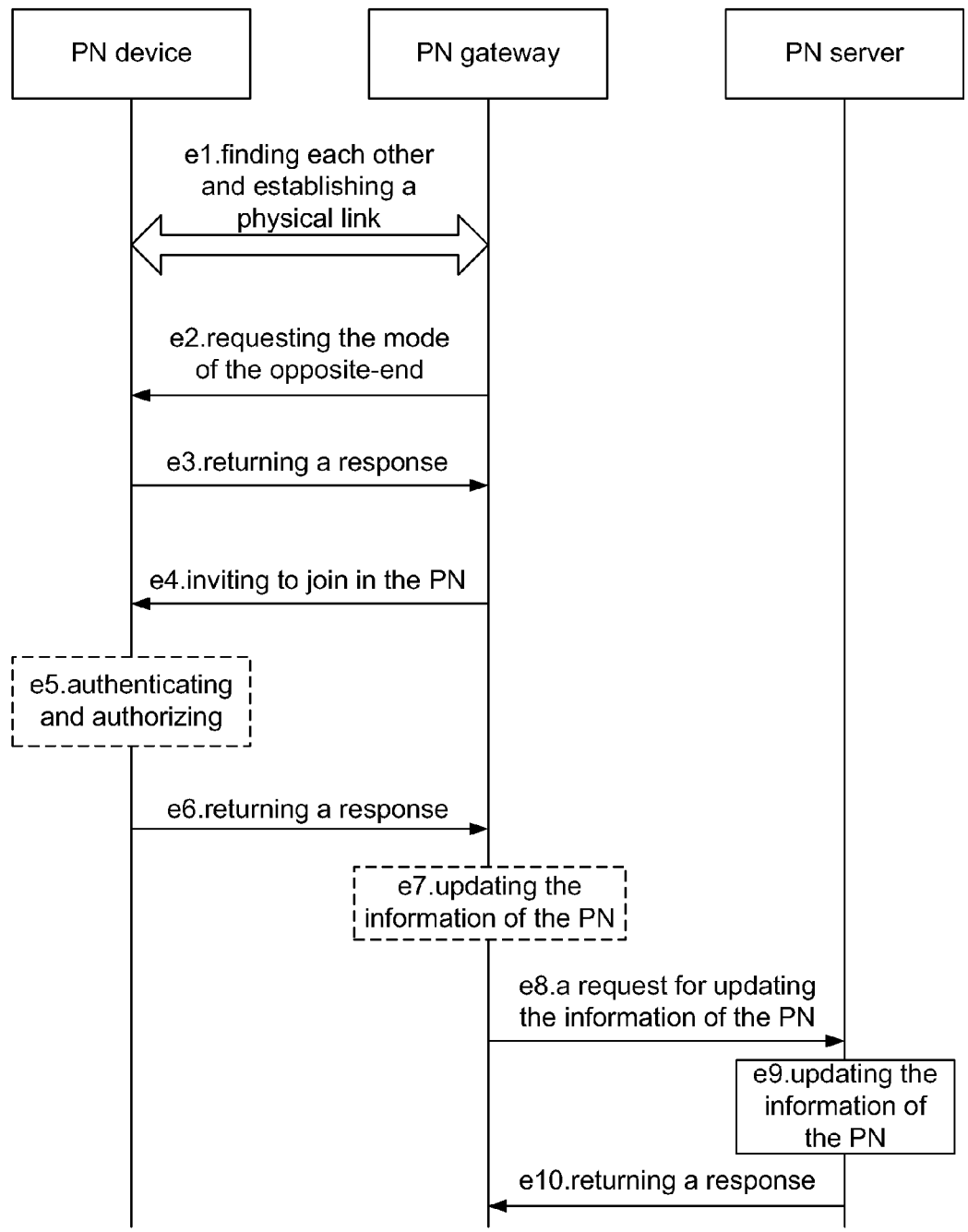
FIG. 5 is a schematic diagram showing a procedure in which the PN device is invited to join in the PN and which is initiated by the PN gateway according to the disclosure.

Case 2, the PN device is invited to join in the PN by other devices, as show in FIG. 5 which illustrates that the invitation is initiated by the PN gateway and which also illustrates the procedure in which the PN device is invited to join in the PN, the joining procedure mainly includes:

e1, the PN gateway and the PN device find each other and establish a physical link;

e2, the PN gateway sends to the PN device a request for obtaining the mode (role) thereof;

e3, the PN device returns the response to the PN gateway;

e4, the PN gateway sends to the PN device a request for inviting the PN device to join in the PN;

e5, the PN device performs operations, such as authentication, authorization and the like to the PN gateway;

e6, the PN device returns a response to the PN gateway;

e7, the PN gateway updates the information of the PN;

e8, the PN gateway sends to the PN server a request for updating the information of the PN;

e9, the PN server updates the service group information; and e10, the PN server returns a response to the PN gateway.

Here, the e5 and the e7 are optional.

Figure 6:
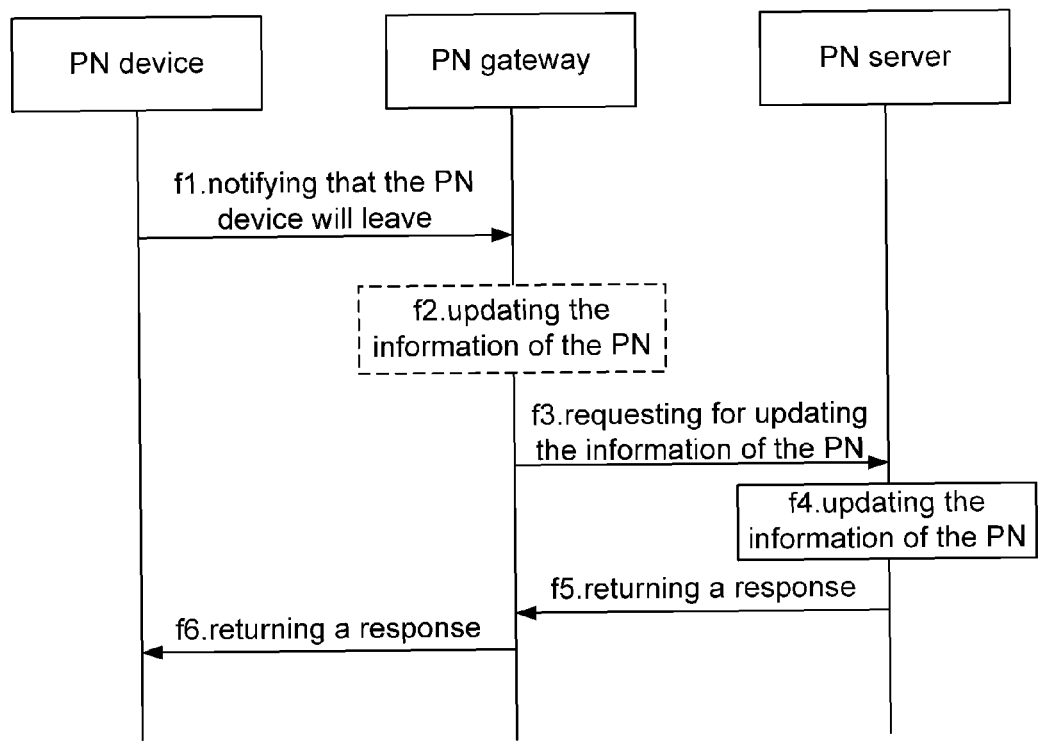
FIG. 6 is a schematic diagram showing a procedure in which the PN device actively leaves the PN according to the disclosure.

4, the PN device leaves the PN, wherein the FIG. 6 shows a procedure which is actively initiated by the PN device and in which the PN device leaves the PN, and the leaving procedure mainly includes:

f1, the PN device notifies the PN gateway that the PN device will leave the PN;

f2, the PN gateway updates the information of the PN;

f3, the PN gateway requests the PN server to update the information of the PN;

f4, the PN server updates the information of the PN;

f5, the PN server returns a response to the PN gateway; and f6, the PN gateway returns the response to the PN device.

Here, the f2 is optional.

It should be pointed out that an explanation for the mode described above is as follows:

the mode includes any one of the following: the PN device, the PN gateway, and the PN server; and when the opposite-end device operates in one mode at the same time, the opposite-end device judges whether it can operate in the PN device mode, the PN mode or the PN server mode according to the current capability.

One device in the PN may include any one of the above-mentioned three modes or a combination thereof according to the capability of the device, but generally, the device may only operate in one of the modes at the same time. For example, in the procedure of establishing the PN, one PN device, such as the PN device A, requests to obtain the mode of the opposite-end device which is the PN gateway at this time, the procedure can be realized specifically by inquiring whether the PN gateway has the capability of PN gateway, such as the capability of visiting the Internet, and whether the PN gateway is willing to work in the PN gateway mode currently. Before the PN device A performs the inquiry, the PN gateway possibly does not work in the PN mode, but when the PN device A performs the inquiry, if the PN gateway has an ability to become the PN gateway and is willing to become the PN gateway so as to operate in the PN gateway mode, then the PN gateway changes the mode thereof into the PN gateway mode and returns the changed mode, namely, the PN gateway mode to the PN device A.

The disclosure will be described by the examples below.

EXAMPLE 1

For a user A, the mode of the mobile phone is the PN gateway and the mode of the MP4 player is the PN device, both of them support the BLUETOOTH wireless protocol; the MP4 player of the user A invites the mobile phone of the user A to establish a PN. The establishment procedure includes the following steps:

step 101, the MP4 player of the user A and the mobile phone of the user A find each other and establish a physical link through the BLUETOOTH wireless protocol;

step 102, the MP4 player of the user A request the mobile phone of the user A to obtain the mode thereof;

step 103, the mobile phone of the user A returns the mode being the PN gateway to the MP4 player of the user A;

step 104, the MP4 player of the user A sends a request for establishing the PN to the mobile phone of the user A;

step 105, the mobile phone of the user A authenticates and authorizes the MP4 player of the user A and allocates an identifier for it;

step 106, the mobile phone of the user A sends a registration request to the PN server;

step 107, the PN server authenticates and authorizes the mobile phone of the user A;

step 108, the PN server stores the information of the PN;

step 109, the PN server returns a response to the mobile phone of the user A; and step 110, the mobile phone of the user A returns a response to the MP4 player of the user A.

EXAMPLE 2

The mobile phone (the PN gateway), the MP4 player A and the MP4 player B exist in the PN; the procedure, in which the MP4 player A (the PN device) requests to release the PN, includes the following steps:

step 201, the MP4 player A sends a request for releasing the PN to the mobile phone;

step 202, the mobile phone sends the request for releasing the PN to the PN server;

step 203, the PN server deletes the information of the PN;

step 204, the PN server returns a response to the mobile phone;

step 205, the mobile phone returns the response to the MP4 player A; and step 206, the mobile phone notifies the MP4 player B that the PN is released.

EXAMPLE 3

The mobile phone (the PN gateway), the MP4 player A and the MP4 player B exist in the PN; the procedure, in which the PN server notifies that the PN will be released, includes the following steps:

step 301, the PN server notifies the mobile phone to release the service group;

step 302, the mobile phone notifies the MP4 players A and B to release the service group;

step 303, the MP4 players A and B return a response to the mobile phone;

step 304, the mobile phone returns the response to the PN server; and step 305, the PN server deletes the information of the PN.

EXAMPLE 4

The mobile phone (the PN gateway) and the MP4 player A (the PN device) rather than the MP4 player B exist in the PN, all of them support the BLUETOOTH wireless protocol. The procedure, in which the MP4 player B (the PN) requests to join in the PN, includes the following steps:

step 401, the MP4 player B and the mobile phone find each other and establish a physical link through the BLUETOOTH wireless protocol;

step 402, the MP4 player B requests for the mode of the mobile phone;

step 403, the mobile phone returns the mode being PN gateway to the MP4 player B;

step 404, the mobile phones of users A and B return a response to the PN server according to the response from the MP4;

step 405, the MP4 player B inquires whether the mobile phone has belonged to a certain PN;

step 406, the mobile phone returns a response to the MP4 player B to illustrated that the mobile phone has belonged to one PN;

step 407, the MP4 player B sends a request for joining in the PN to the mobile phone;

step 408, the mobile phone sends a request for updating the information of the PN to the PN server;

step 409, the PN server updates the information of the PN;

step 410, the PN server returns a response to the mobile phone; and step 411, the mobile phone returns the response to the MP4 player B.

EXAMPLE 5

The mobile phone (the PN gateway), the MP4 player A (the PN device) and the MP4 player B (the PN device) exist in the PN and the procedure, in which the MP4 player B (the PN device) actively requests to leave the PN, includes the following steps:

step 501, the MP4 player B notifies the mobile phone that it will leave the PN;

step 502, the mobile phone updates the information of the PN;

step 503, the mobile phone sends a request for updating the information of the PN to the PN server;

step 504, the PN server updates the information of the PN;

step 505, the PN server returns a response to the mobile phone; and step 506, the mobile phone returns the response to the MP4 player B.

A system for managing a Personal Network (PN) includes a management unit for realizing a management for the PN by any one of management ways including establishing the PN, releasing the PN, adding a PN device in the PN and enabling the PN device to leave the PN or a combination thereof; wherein establishing the PN includes: the PN device requests for a mode of an opposite-end device; the PN device requests a PN gateway to establish the PN when the mode returned by the opposite-end device is the PN gateway; the PN gateway sends a registration request to a PN server; and the PN server stores information of the PN.

Here, the management unit is further configured to cause the PN device and the PN gateway to find each other and establish a physical link before the PN device requests for the mode of the PN gateway when the PN device initiates the establishment of the PN.

Here, when the PN device initiates the release of the PN, the management unit is further configured to cause: the PN device to send a request for releasing the PN to the PN gateway; the PN gateway to send the request for releasing the PN to the PN server; the PN server to delete the information of the PN; and the PN gateway to notify each of the other PN devices of the PN that the PN is released; wherein each of the other PN devices is a device in the PN other than the PN device that initiates the request for releasing the PN.

Here, when the PN gateway initiates the release of the PN, the management unit is further configured to cause: the PN gateway to send a request for releasing the PN to the PN server; the PN server to delete the information of the PN; and the PN gateway to notify all PN devices of the PN that the PN is released.

Here, when the PN server initiates the release of the PN, the management unit is further configured to cause: the PN server to notify the PN gateway that all PN devices of the PN that the PN will be released via the PN gateway; and the PN server to delete the information of the PN.

Here, when the PN device requests to join in the PN, the management unit is further configured to cause: the PN device to request for the mode of the PN gateway; the PN gateway to return the mode being the PN gateway to the PN device; the PN device to inquire whether the PN gateway belongs to one PN; the PN gateway to return the PN to which the PN gateway belongs to the PN device; and the PN device to send a request for joining in the PN to which the PN gateway belongs to the PN gateway, and to join in the PN.

Here, when the PN device is invited to join in the PN by other devices which are PN gateways, the managing unit is further configured to cause: the PN gateway requests for the mode of the PN device; the PN device to return the mode being the PN device to the PN gateway; the PN gateway to send a request for inviting the PN device to join in the PN to the PN device, and the PN device to join in the PN.

Here, when the PN device determines to leave the PN, the management unit is further configured to cause: the PN device to notify the PN gateway that the PN device will leave the PN; the PN gateway to request the PN server to update the information of the PN; the PN server to update the information of the PN; and the PN device to leave the PN.

All those described above are only the preferred embodiment of the disclosure and are not intended to limit the protection scope of the disclosure.

What is claimed is:

1. A method for managing a Personal Network (PN), comprising:
   realizing a management for the PN by any one of management ways including establishing the PN, releasing the PN, adding a PN device in the PN and enabling the PN device to leave the PN or a combination thereof;
   wherein establishing the PN comprises: requesting, by the PN device, for a mode of an opposite-end device; when the mode returned by the opposite-end device is a PN gateway, requesting, by the PN device, the PN gateway to establish the PN; sending, by the PN gateway, a registration request to a PN server; and storing, by the PN server, information of the PN;
   wherein the information of the PN comprises at least one of: a name of the PN, an identifier of the PN, and member information of the PN, wherein the mode comprises any one of the following: the PN device, the PN gateway and the PN server,
   when the PN gateway initiates the release of the PN, sending, by the PN gateway, a request for releasing the PN to the PN server; deleting, by the PN server, the information of the PN; and notifying, by the PN gateway, all PN devices of the PN that the PN is released.

2. The method according to claim 1, further comprising: returning, by the PN server, a response to the PN gateway after the PN server stores the information of the PN; and returning, by the PN gateway the response to the PN device.

3. The method according to claim 1, further comprising: when the PN device initiates the release of the PN, sending, by the PN device, a request for releasing the PN to the PN gateway; sending, by the PN gateway, the request for releasing the PN to the PN server; deleting, by the PN server, the information of the PN; and notifying, by the PN gateway, each of the other PN devices in the PN that the PN is released; wherein each of the other PN devices is a device in the PN other than the PN device that initiates the request for releasing the PN.

4. The method according to claim 1, further comprising: when the PN server initiates the release of the PN, notifying, by the PN server, the PN gateway that the PN will be released; notifying, by the PN gateway, all PN devices of the PN that the PN will be released; and deleting, by the PN server, the information of the PN.

5. The method according to claim 1, further comprising: when the PN device requests to join in the PN, requesting, by the PN device, for the mode of the PN gateway; returning, by the PN gateway, the mode being the PN gateway to the PN device; inquiring, by the PN device, whether the PN gateway belongs to one PN; returning, by the PN gateway, the PN to which the PN gateway belongs to the PN device; and sending, by the PN device, a request for joining in the PN to which the PN gateway belongs to the PN gateway, and joining in the PN.

6. The method according to claim 1, further comprising: when the PN device is invited to join in the PN by other devices which are PN gateways, requesting, by the PN gateway, for the mode of the PN device; returning, by the PN device, the mode being the PN device to the PN gateway; sending, by the PN gateway, a request for inviting the PN device to join in the PN to the PN device, and joining, by the PN device, in the PN.

7. The method according to claim 1, further comprising: when the PN device determines to leave the PN, notifying, by the PN device, the PN gateway that the PN device will leave the PN; requesting, by the PN gateway, the PN server to update the information of the PN; updating, by the PN server, the information of the PN so that the PN device leaves the PN.

8. A system for managing a Personal Network (PN), comprising a management unit including a processor for realizing a management for the PN by any one of management ways including establishing the PN, releasing the PN, adding a PN device in the PN and enabling the PN device to leave the PN or a combination thereof;
   wherein establishing the PN comprises: the PN device requests for a mode of an opposite-end device; the PN device requests a PN gateway to establish the PN when the mode returned by the opposite-end device is the PN gateway; the PN gateway sends a registration request to a PN server; and the PN server stores information of the PN,
   wherein the mode comprises any one of the following: the PN device, the PN gateway and the PN server,
   wherein when the PN gateway initiates the release of the PN, the management unit is further configured to cause: the PN gateway to send a request for releasing the PN to the PN server; the PN server to delete the information of the PN; and the PN gateway to notify all PN devices of the PN that the PN is released.

9. The system according to claim 8, wherein when the PN device initiates the release of the PN, the management unit is further configured to cause: the PN device to send a request for releasing the PN to the PN gateway; the PN gateway to send the request for releasing the PN to the PN server; the PN server to delete the information of the PN; and the PN gateway to notify each of the other PN devices of the PN that the PN is released; wherein each of the other PN devices is a device in the PN other than the PN device that initiates the request for releasing the PN.

10. The system according to claim 8, wherein when the PN server initiates the release of the PN, the management unit is further configured to cause: the PN server to notify the PN gateway that all PN devices of the PN that the PN will be released via the PN gateway; and the PN server to delete the information of the PN.

11. The system according to claim 8, wherein when the PN device requests to join in the PN, the management unit is further configured to cause: the PN device to request for the mode of the PN gateway; the PN gateway to return the mode being the PN gateway to the PN device; the PN device to inquire whether the PN gateway belongs to one PN; the PN gateway to return the PN to which the PN gateway belongs to the PN device; and the PN device to send a request for joining in the PN to which the PN gateway belongs to the PN gateway, and to join in the PN.

12. The system according to claim 8, wherein when the PN device is invited to join in the PN by other devices which are PN gateways, the managing unit is further configured to cause: the PN gateway requests for the mode of the PN device; the PN device to return the mode being the PN device to the PN gateway; the PN gateway to send a request for inviting the PN device to join in the PN to the PN device, and the PN device to join in the PN.

13. The system according to claim 8, wherein when the PN device determines to leave the PN, the management unit is further configured to cause: the PN device to notify the PN gateway that the PN device will leave the PN; the PN gateway to request the PN server to update the information of the PN; the PN server to update the information of the PN; and the PN device to leave the PN.

* * * * *